US012567696B2

(12) United States Patent

Chen et al.

(10) Patent No.: US 12,567,696 B2
(45) Date of Patent: Mar. 3, 2026

(54) CONNECTOR ASSEMBLY

(71) Applicant: Tyco Electronics (Shanghai) Co., Ltd., Shanghai (CN)

(72) Inventors: Dalei (Otto) Chen, Shanghai (CN); Hongbo (Daniel) Zhang, Shanghai (CN)

(73) Assignee: Tyco Electronics (Shanghai) Co., Ltd., Shanghai (CN)

(*) Notice: Subject to any disclaimer, the term of this patent is extended or adjusted under 35 U.S.C. 154(b) by 402 days.

(21) Appl. No.: 17/961,757

(22) Filed: Oct. 7, 2022

(65) Prior Publication Data

US 2023/0116329 A1 Apr. 13, 2023

(30) Foreign Application Priority Data

Oct. 8, 2021 (CN) ........................ 202122420940.4
Jul. 18, 2022 (CN) ........................ 202221851938.0

(51) Int. Cl.
*H01R 13/52* (2006.01)
*H01R 13/74* (2006.01)

(52) U.S. Cl.
CPC ......... *H01R 13/5202* (2013.01); *H01R 13/74* (2013.01)

(58) Field of Classification Search
CPC ............................ H01R 13/5202; H01R 13/74
See application file for complete search history.

(56) References Cited

U.S. PATENT DOCUMENTS

| | | | | | |
|---|---|---|---|---|---|
| 4,031,348 | A * | 6/1977 | Eberhardt | G04C 3/001 | 200/530 |
| 4,109,230 | A * | 8/1978 | Frey, Jr. | H01C 10/26 | 338/130 |
| 4,386,254 | A * | 5/1983 | Eberhardt | G04C 3/005 | 200/302.1 |
| 5,037,325 | A * | 8/1991 | Wirkus | H01R 13/743 | 439/467 |
| 6,113,424 | A * | 9/2000 | Shinozaki | H01R 13/5202 | 439/559 |
| 6,422,899 | B1 * | 7/2002 | Miyazaki | H01R 13/748 | 439/271 |
| 6,953,357 | B2 * | 10/2005 | Fukushima | H01R 13/5219 | 439/271 |
| 7,329,145 | B2 * | 2/2008 | Yagome | H01R 13/5219 | 439/271 |
| 7,341,484 | B2 * | 3/2008 | Yamamoto | H01R 13/5202 | 439/271 |
| 7,597,589 | B2 * | 10/2009 | Kawamura | H01R 13/4223 | 439/871 |
| 8,167,634 | B2 * | 5/2012 | Fujiwara | H01R 13/5202 | 439/271 |
| 8,262,413 | B2 * | 9/2012 | Fujiwara | H01R 13/748 | 439/939 |
| 8,992,249 | B2 * | 3/2015 | Kobayashi | H01R 13/6581 | 439/564 |

(Continued)

*Primary Examiner* — Thanh Tam T Le
(74) *Attorney, Agent, or Firm* — Barley Snyder

(57) ABSTRACT

A connector assembly includes a housing having a flange along a circumferential direction, the flange has a groove spaced radially from the housing, and a sealing element disposed in the groove and forming a seal between the flange and a panel that has an opening receiving the housing. The sealing element is pressed against the panel when the housing partially passes through the opening of the panel.

21 Claims, 6 Drawing Sheets

(56) References Cited

U.S. PATENT DOCUMENTS

| | | | | |
|---|---|---|---|---|
| 9,059,534 | B2 * | 6/2015 | Endo | H01R 13/5205 |
| 9,722,350 | B1 * | 8/2017 | Baldwin | H01R 43/26 |
| 10,038,287 | B2 * | 7/2018 | Yamada | H01R 13/5202 |
| 10,074,926 | B2 * | 9/2018 | Rui | H01R 13/5202 |
| 10,116,093 | B2 * | 10/2018 | Ishibashi | H01R 13/748 |
| 10,355,396 | B2 * | 7/2019 | Zhao | H01R 13/5219 |
| 10,396,486 | B2 * | 8/2019 | de Chazal | H01R 13/4362 |
| 10,511,119 | B2 * | 12/2019 | Makino | H01R 13/5202 |
| 10,630,021 | B2 * | 4/2020 | Shiraishi | H01R 13/5219 |
| 10,985,510 | B2 * | 4/2021 | Saito | H01R 13/5202 |
| 11,050,185 | B2 * | 6/2021 | Minamino | H01R 13/5219 |
| 11,777,251 | B2 * | 10/2023 | Sasaki | H01R 13/629<br>439/587 |

* cited by examiner

CONNECTOR ASSEMBLY

CROSS-REFERENCE TO RELATED APPLICATIONS

This application claims the benefit of the filing date under 35 U.S.C. § 119(a)-(d) of Chinese Patent Application No. 202122420940.4, filed on Oct. 8, 2021, and Chinese Patent Application No. 202221851938.0, filed on Jul. 18, 2022.

FIELD OF THE INVENTION

The present application relates to a connector assembly, in particular to a connector assembly that is mountable onto a panel, at an opening of the panel.

BACKGROUND

In refrigeration devices such as refrigerators and freezers, connector assemblies having superior sealing properties are typically used to prevent foaming agents, water or other contaminants from entering the connector assemblies and to avoid short circuiting or open circuiting in the connector assemblies. In order to form a fine seal, connectors are often adhered to a panel by using an adhesive tape and glue, and the panel with the connectors adhered thereto is then installed to a matching panel in the refrigeration device.

The use of adhesive tape and glue, however, will lead to a series of problems. The panel with adhesive tapes and glues may not be reused, resulting in a waste of materials and increased costs. Further, the use of adhesive tape and glue requires a relatively long operation time, and such operation is implemented manually, which not only requires additional staff training, but is also difficult to standardize, leading to potential risks in quality. These problems become especially serious when refrigeration devices are mass produced.

SUMMARY

A connector assembly includes a housing having a flange along a circumferential direction, the flange has a groove spaced radially from the housing, and a sealing element disposed in the groove and forming a seal between the flange and a panel that has an opening receiving the housing. The sealing element is pressed against the panel when the housing partially passes through the opening of the panel.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
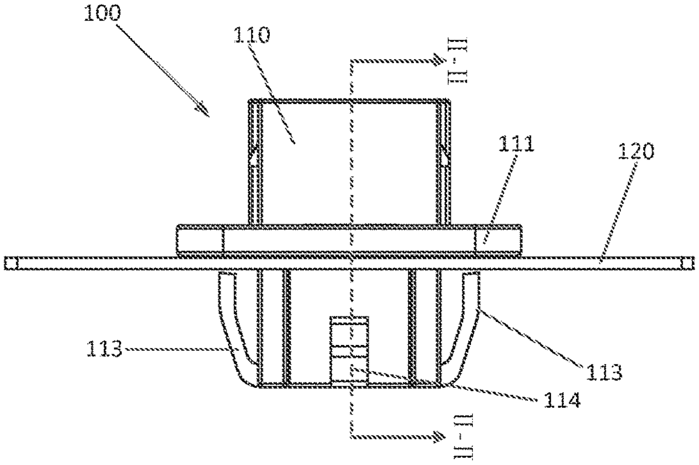
FIG. 1 is a perspective view of a connector assembly according to a first embodiment.

The technical solutions of the present application will be further described in detail below through embodiments and in conjunction with the accompanying drawings. In the specification, the same or similar reference numerals refer to the same or similar parts. The following description of the embodiments of the present application with reference to the accompanying drawings is intended to explain the general application concept of the present application, and should not be construed as a limitation to the present application.

Furthermore, in the following detailed description, for convenience of explanation, numerous specific details are set forth in order to provide a thorough understanding of the embodiments of the present disclosure. Obviously, however, one or more embodiments may be practiced without these specific details. In other instances, well-known structures and devices are shown in diagram form in order to simplify the drawings.

Figure 2:
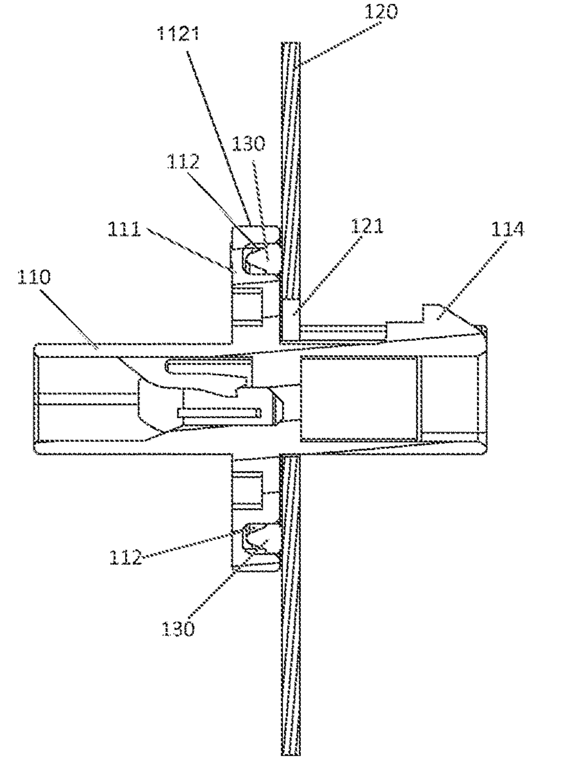
FIG. 2 is a sectional side view of the connector assembly, taken along line II-II of FIG. 1.
Figure 3:
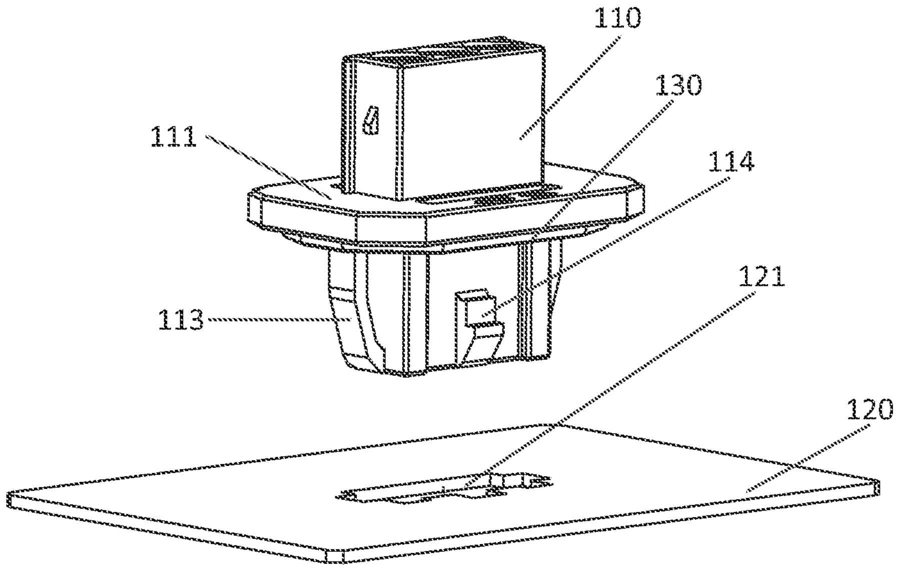
FIG. 3 is an exploded perspective view of a housing and a panel of the connector assembly.

A connector assembly 100 according to an embodiment is shown in FIG. 1-3. In an exemplary embodiment, the connector assembly 100 can be used in a refrigeration device.

The connector assembly 100 is mountable onto a panel 120, at an opening 121 of the panel 120, and the connector assembly 100 comprises a housing 110 and a sealing element 130. Connection terminals for electrical connection with a mating connector in the refrigeration device are provided in the housing 110. The housing 110 is also provided with a connecting portion 114 for mating and connecting with the mating connector in order to facilitate a connection of the connector assembly 100 with the mating connector.

As shown in FIGS. 1-4, a flange 111 is provided circumferentially around and longitudinally centered on the housing 110. The housing 110 partially passes through the panel 120 via the opening 121 in the panel 120 such that the flange 111 abuts on the panel 120. A groove 112 which is arranged to be radially spaced from the housing 110 and configured for accommodating a sealing element 130 is formed in the flange 111 so that the sealing element 130 is pressed against the panel 120 to form a seal between panel 120 and the flange 111 when the housing 110 partially passes through the panel 120 via the opening 121, preventing foaming agent, water or other contaminants from entering interior of the connector assembly 100 between the flange 111 and the panel 120 (i.e., entering the opening 121 in the panel 120 (see FIG. 2)).

The groove 112 has an outer side wall 1121, shown in FIG. 2, in an outward direction facing away from the housing 110, which extends continuously in the circumferential direction. An arrangement in which the groove 112 and the sealing element 130 received in the groove 112 are radially spaced from the housing 110 (see FIG. 9, the sealing element 130 is located radially on the outer side of the opening 121 in an assembled state) blocks the contaminants away from the housing 110 at a greater distance with respect to the housing 110, thereby improving safety and reliability of the seal.

In a condition that the housing 110 is assembled onto the panel 120, the connector assembly 100 is installed into the refrigeration device by the panel 120. In this way, the assembly of the connector assembly 100 and the installation of the connector assembly 100 in the refrigeration device may be realized by a simple plugging-in fit between the housing 110 and the panel 120, without the need for adhesive tape and glue, not only facilitating re-utilization of the housing 110, the panel 120, the sealing element 130 and saving in both materials and assembly time, but also avoiding additional staff training, realizing standardization of operations; mass use of the connector assembly 100 improves efficiency.

Figure 4:
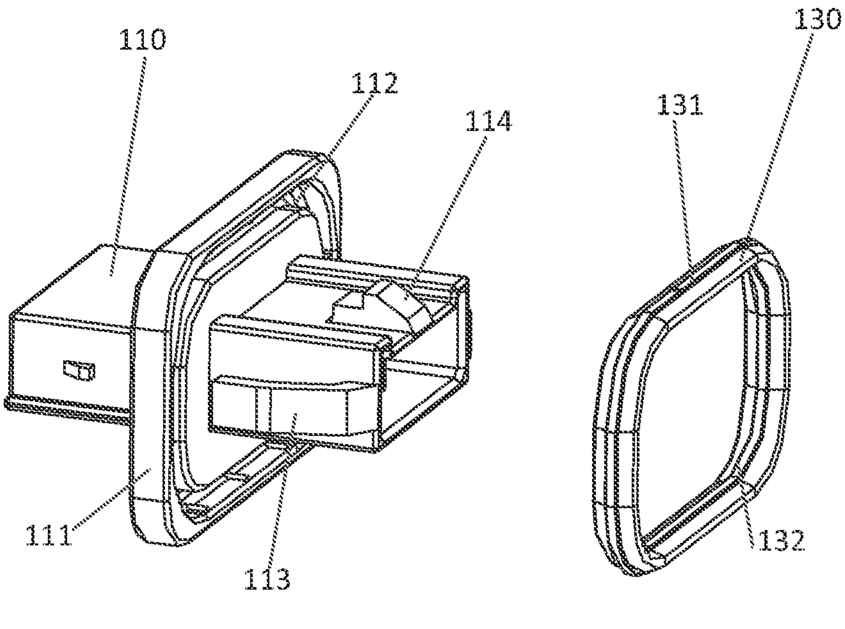
FIG. 4 is an exploded perspective view of the housing and a sealing element.
Figure 5:
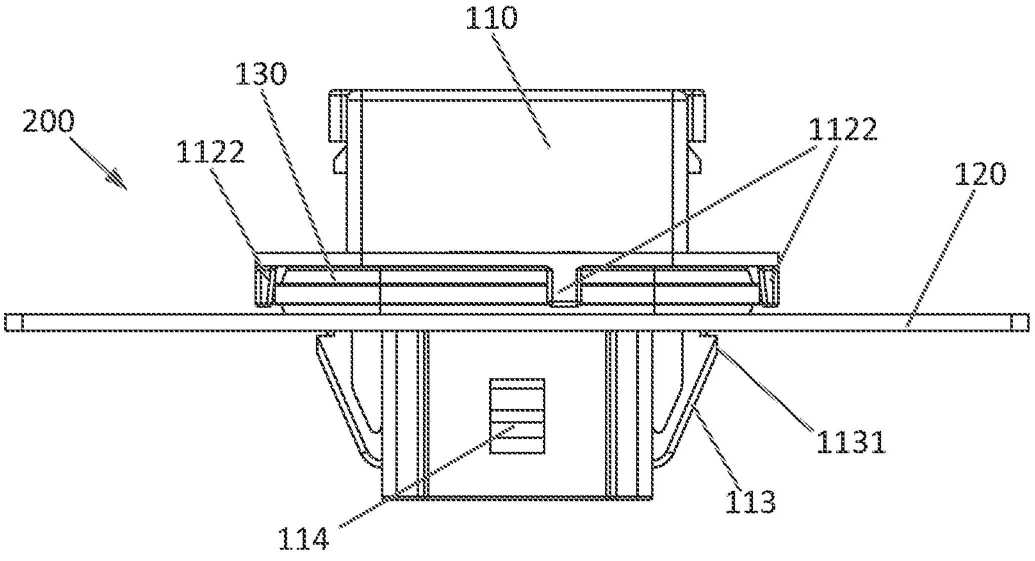
FIG. 5 is a top view of a connector assembly according to a second embodiment.
Figure 6:
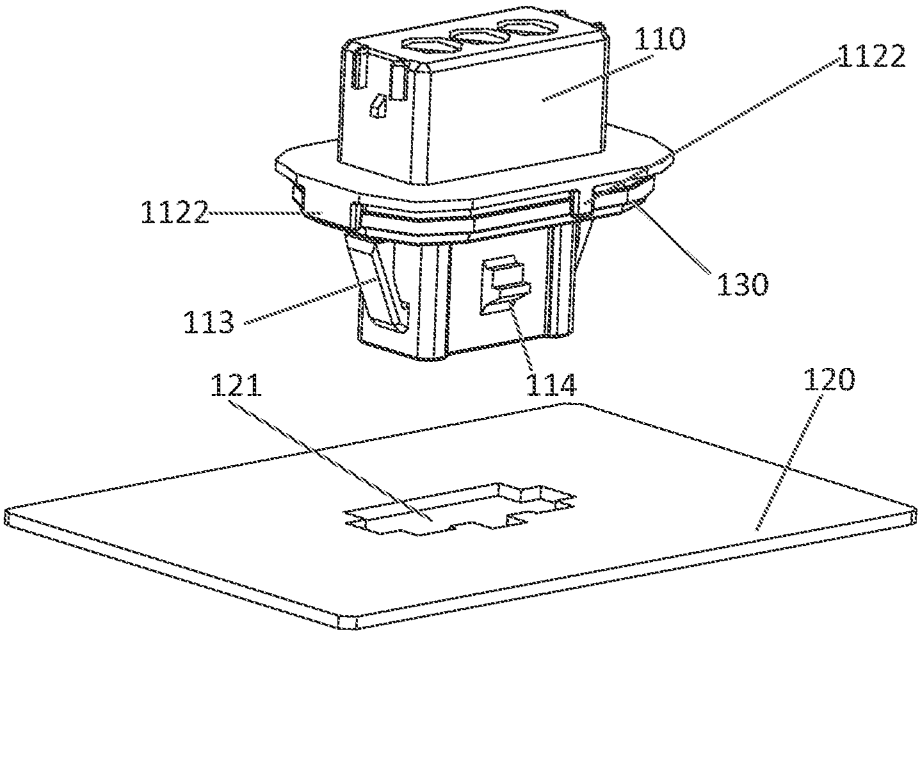
FIG. 6 is an exploded perspective view of the housing and the panel of the connector assembly of FIG. 5.
Figure 7:
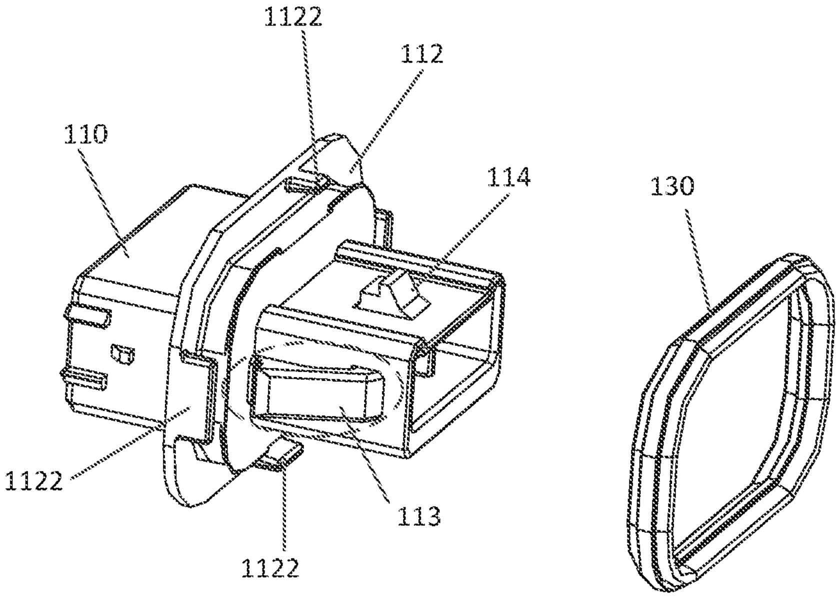
FIG. 7 is an exploded perspective view of the housing of FIG. 6 and a sealing element.
Figure 9:
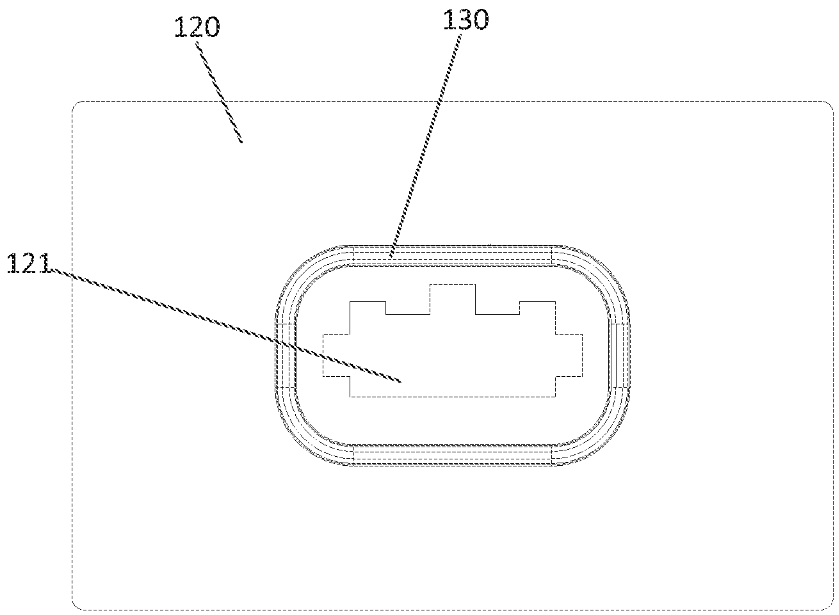
FIG. 9 is a top view of a relative position of the sealing element with respect to the panel.

As shown in FIGS. 4 and 9, in this embodiment, the sealing element 130 is made of rubber and configured in the shape of a ring, thereby forming a seal along entire circumference of the housing 110. However, this is not limitative, and suitable materials may be used to form the sealing element 130 and the shape of the sealing element 130 may be set according to actual needs.

In order to further improve the sealing property of the sealing element 130, the sealing element 130 is provided with a first protrusion 131 located on an outer side of the ring (i.e., the side of the ring facing away from the housing 110, see FIG. 4) and a second protrusion 132 located on an inner side of the ring (i.e., the side of the ring facing the housing 110, see FIG. 4). Each of the first protrusion 131 and the second protrusion 132 may form an interference fit with respective one of two opposite side walls of the groove 112, so as to fix the sealing element 130 securely within the groove 112.

Figure 10:
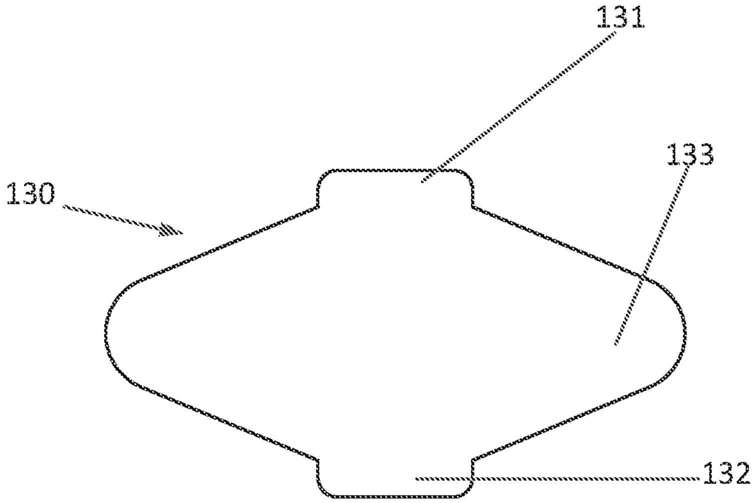
FIG. 10 is a sectional side view of the sealing element in an uncompressed condition.
Figure 11:
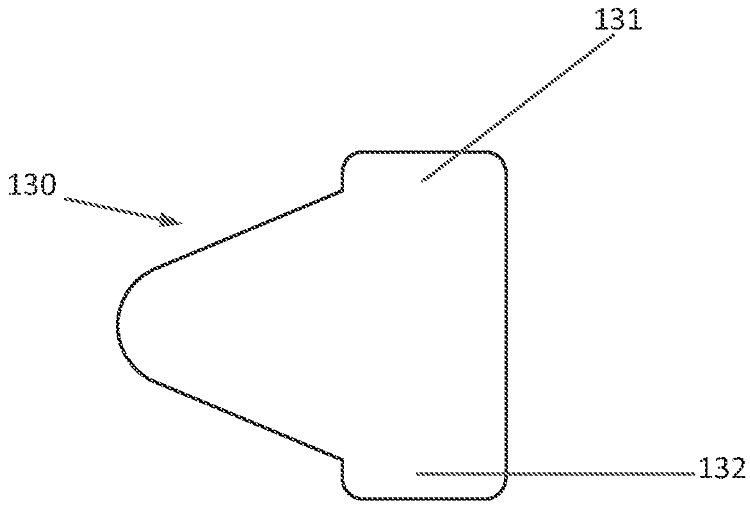
FIG. 11 is a sectional side view of the sealing element in a compressed condition.

As shown in FIG. 10, the sealing element 130 is constructed to have a substantially diamond-shaped cross-section, the first protrusion 131 and the second protrusion 132 are located at opposite vertices of the substantially diamond shape, respectively, so as to secure the sealing element 130, on its two opposite sides, within the groove 112 such that the substantially diamond-shaped cross-section is compressed into a substantially conical shape (see FIG. 11) when the sealing element 130 is pressed against the panel 120. That is, one vertex 133 of the substantially diamond-shaped cross-section facing the panel 120 is compressed into a substantially flat surface when pressed against the panel 120, this greater deformation of the vertex 133 facilitates formation of a good seal between the sealing element 130 and the panel 120.

As shown in FIGS. 1, 3 and 4, the housing 110 has two resilient arms 113 on two opposite sides of the housing 110 respectively to assist in positioning the panel 120 when the connector assembly 100 is assembled. Each of the resilient arms 113 extends obliquely with respect to a longitudinal direction (i.e., a direction along which the dotted line in FIG. 1 extends) from the housing 110 towards the flange 111, so that the panel 120 is located between free ends of the resilient arms 113 and the flange 111 once the housing 110 partially passes through the panel 120 via the opening 121. The free ends of the resilient arms 113 are directed towards the panel 120 and are laterally offset from the opening 121, preventing the resilient arms 113 from accidentally passing through the opening 121 in the panel 120 and also from causing a separation between the flange 111 and the panel 120. Rather than resting against the panel 120, the free ends of the resilient arms 113 are slightly spaced from the panel 120, facilitating pushing and pressing the resilient arms 113 in a transverse direction (i.e., a direction orthogonal to the direction which extends along the dotted line as illustrated in FIG. 1), so that the free ends of the resilient arms 113 direct towards the opening 121, thereby removing the panel 120 from the housing 110.

Referring to FIGS. 5-8, another type of connector assembly 200 is shown. The connector assembly 200 differs from the connector assembly 100 in that the groove 112 is provided with a plurality of fixing portions 1122 in an outward direction facing away from the housing 110, which are spaced apart from one another in the circumferential direction (see FIGS. 5-7). A number and distribution of the fixing portions 1122 may be selected as appropriate. The provision of the plurality of fixing portions 1122 not only further simplifies the groove 112 and in turn facilitates installation of the sealing element 130 in the groove 112, but also further reduces manufacturing cost of the connector assembly 200.

Figure 8:
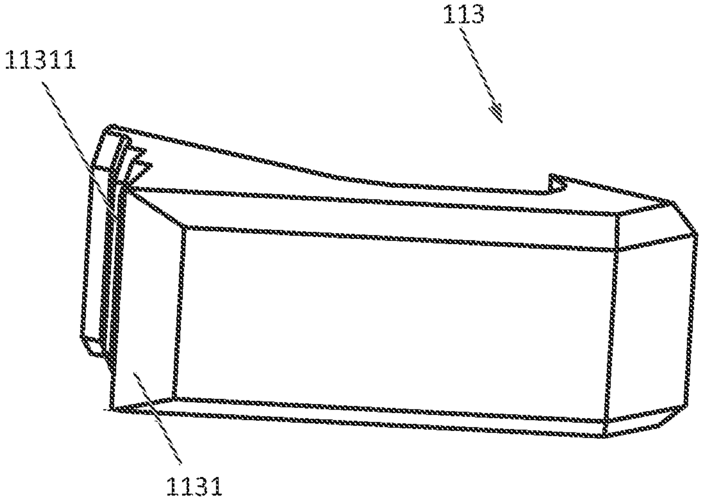
FIG. 8 is an enlarged view of a resilient arm within a dashed circle in FIG. 7.

In addition, the connector assembly 200 is also different from the connector assembly 100 in that each of the free ends 1131 of the resilient arms 113 has a sawtooth end face 11311, shown in FIG. 8, facing towards the panel 120. When the panel 120 moves towards the sawtooth end face 11311, the sawtooth end face 11311 may readily abut against an edge of the opening 121 in the panel 120, thereby further preventing the respective resilient arm 113 from accidentally passing through the opening 121 in the panel 120 and in turn a separation of the flange 111 from the panel 120, thereby increasing reliability of the connector assembly 200.

Those skilled in the art may understand that the above-described embodiments are all exemplary, and those skilled in the art may make improvements thereto, and the structures described in the various embodiments may be freely combined without conflict in terms of structure or principle. After describing the embodiments of the present application in detail, those skilled in the art may clearly understand that various changes and modifications may be made without departing from the protection scope and spirit of the appended claims, and the present application is not limited to implementations of the exemplary embodiments set forth in the specification.

What is claimed is:

1. A connector assembly, comprising:

a housing having a flange along a circumferential direction, the flange has a groove spaced radially from the housing; and a sealing element forming a seal between the flange and a panel that has an opening receiving the housing, the sealing element has a diamond-shaped cross-section and is pressed against the panel when the housing partially passes through the opening of the panel, one vertex of opposite vertices of the diamond-shaped cross-section is disposed in the groove, when the sealing element is pressed against the panel, the other of the opposite vertices is compressed into a flat shape and the one vertex disposed in the groove maintains a non-compressed shape.

2. The connector assembly of claim 1, wherein the groove has an outer side wall in an outward direction facing away from the housing, the outer side wall extends continuously in the circumferential direction.

3. The connector assembly of claim 1, wherein the groove has a plurality of fixing portions in an outward direction facing away from the housing.

4. The connector assembly of claim 3, wherein the fixing portions are spaced apart from one another in the circumferential direction.

5. The connector assembly of claim 1, wherein the sealing element is shaped as a ring.

6. The connector assembly of claim 5, wherein the sealing element has a first protrusion on an outer side of the ring and a second protrusion on an inner side of the ring.

7. The connector assembly of claim 6, wherein the first protrusion and the second protrusion fix the sealing element in the groove.

8. The connector assembly of claim 7, wherein the first protrusion and the second protrusion are at opposite vertices of the diamond-shaped cross-section.

9. The connector assembly of claim 1, wherein, when the sealing element is pressed against the panel, the diamond-shaped cross-section is compressed into a conical shape.

10. The connector assembly of claim 9, wherein the conical shape has a base at an end of the conical shape and an apex at the other end of the conical shape, the conical shape tapers from the base to the apex.

11. The connector assembly of claim 1, wherein the sealing element is positioned radially outside of the opening of the panel.

12. The connector assembly of claim 11, wherein the sealing element is made of rubber.

13. The connector assembly of claim 1, wherein the housing has a plurality of resilient arms extending obliquely with respect to a longitudinal direction from the housing toward the flange.

14. The connector assembly of claim 13, wherein the panel is located between a plurality of free ends of the resilient arms and the flange in a condition in which the housing partially penetrates the opening of the panel.

15. The connector assembly of claim 14, wherein the free ends of the resilient arms are directed toward the panel and laterally offset from the opening.

16. The connector assembly of claim 14, wherein each of the free ends has a sawtooth end facing toward the panel.

17. The connector assembly of claim 13, wherein the resilient arms on provided on opposite sides of the housing.

18. The connector assembly of claim 1, wherein the flange is longitudinally centered on the housing.

19. The connector assembly of claim 1, wherein the other of the opposite vertices compressed into the flat shape faces the panel, when the sealing element is pressed against the panel, the shape of the other of the opposite vertices changes from a conical shape when uncompressed to the flat shape when compressed.

20. A connector assembly, comprising:

a housing having a flange along a circumferential direction and a plurality of resilient arms extending obliquely with respect to a longitudinal direction from the housing toward the flange, the flange has a groove spaced radially from the housing; and a sealing element forming a seal between the flange and a panel that has an opening receiving the housing, the sealing element has a diamond-shaped cross-section and is pressed against the panel when the housing partially passes through the opening of the panel, one vertex of opposite vertices of the diamond-shaped cross-section is disposed in the groove, when the sealing element is pressed against the panel, the other of the opposite vertices is compressed into a flat shape and the one vertex disposed in the groove maintains a non-compressed shape, the panel is located between a plurality of free ends of the resilient arms and the flange.

21. A connector assembly, comprising:

a housing having a flange along a circumferential direction, the flange has a groove spaced radially from the housing; and a sealing element disposed in the groove and forming a seal between the flange and a panel that has an opening receiving the housing, the sealing element has a diamond-shaped cross-section and is pressed against the panel when the housing partially passes through the opening of the panel, when the sealing element is pressed against the panel, one vertex of opposite vertices of the diamond-shaped cross-section is compressed into a flat shape, the one vertex compressed into the flat shape faces the panel, when the sealing element is pressed against the panel, the shape of the one vertex changes from a conical shape when uncompressed to the flat shape when compressed, and the other of the opposite vertices maintains a non-compressed shape when the sealing element is pressed against the panel and the diamond-shaped cross-section is compressed, the conical shape of the one vertex has a base at an end of the conical shape and an apex at the other end of the conical shape, the conical shape of the one vertex tapers from the base to the apex.

* * * * *